UNITED STATES PATENT OFFICE.

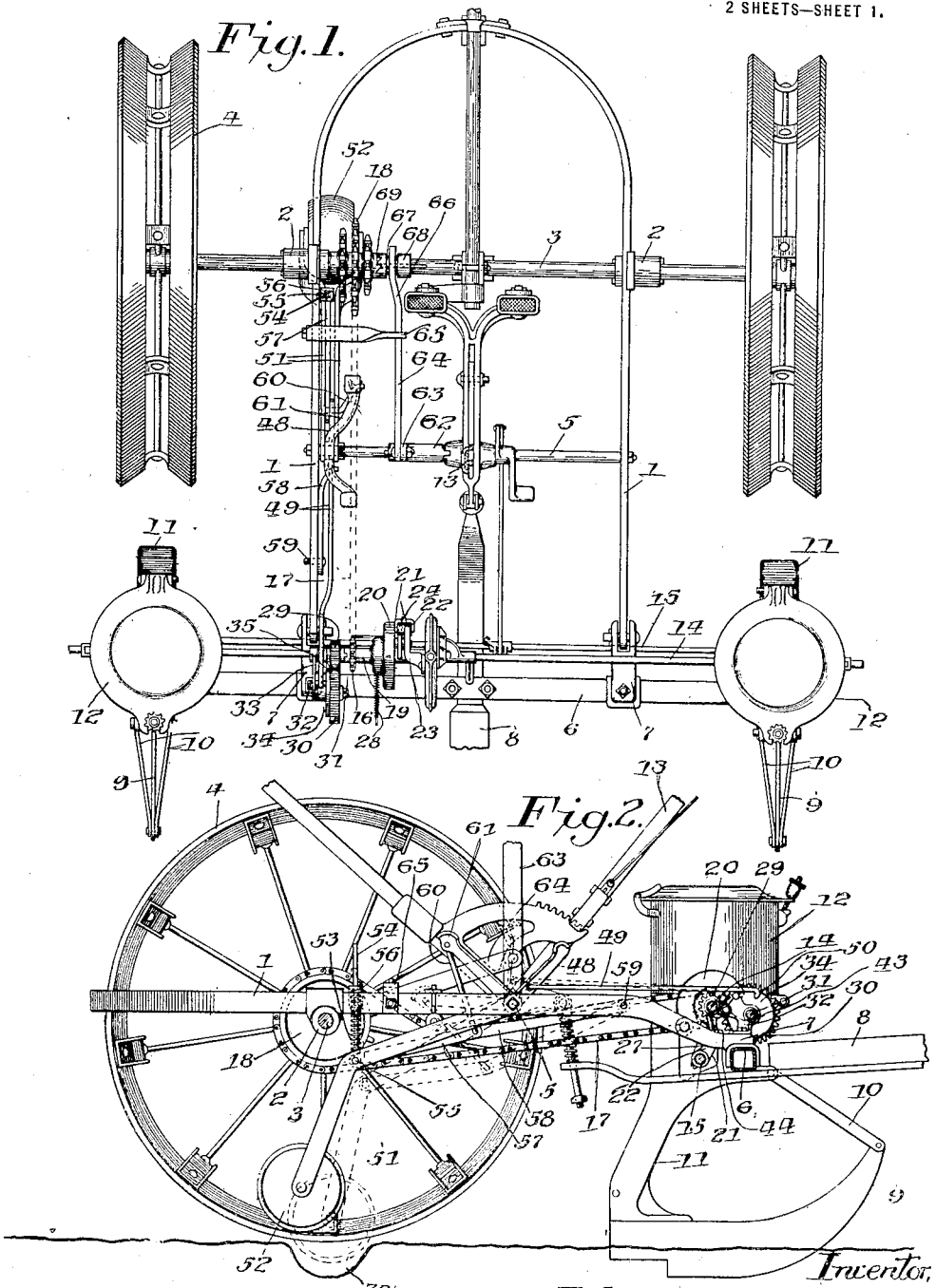

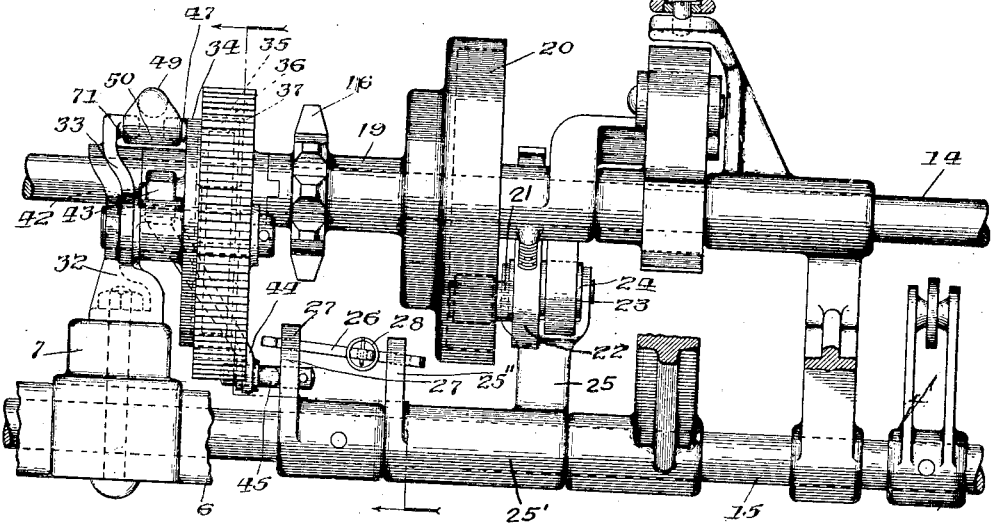

EDWARD W. BURGESS, OF CHICAGO, ILLINOIS, ASSIGNOR, BY MESNE ASSIGNMENTS, TO INTERNATIONAL HARVESTER COMPANY, A CORPORATION OF NEW JERSEY.

CORN-PLANTER.

1,359,028.     Specification of Letters Patent.    Patented Nov. 16, 1920.

Application filed June 15, 1916. Serial No. 103,859.

*To all whom it may concern:*

Be it known that I, EDWARD W. BURGESS, a citizen of the United States, residing at Chicago, in the county of Cook and State of Illinois, have invented certain new and useful Improvements in Corn-Planters, of which the following is a full, clear, and exact specification.

My invention relates to corn planters, and in particular to that class commonly called wireless, wherein the use of a knotted check wire for periodically tripping the clutch mechanism into action is avoided. It comprises means whereby the clutch tripping elements are actuated at predetermined intervals by means controlled by the rotation of the carrying wheels; the object of the invention being to provide automatic means for correcting any inaccuracy in the operation of the checking means, and to curb any irregular movement of the carrying and driving wheels.

This object is attained by means of the mechanism illustrated in the accompanying drawings, in which—

Figure 1 is a top plan view of a corn planter embodying my invention;

Fig. 2 is a side elevation of Fig. 1;

Fig. 3 is a front elevation on an enlarged scale of parts of the regular clutch mechanism connected with the seed shaft of the planter and of part of the automatic mechanism associated therewith;

Fig. 4 is a vertical sectional end elevation of part of Fig. 3 in the direction of the arrow; and Fig. 5 is a similar view from an opposite direction.

The same reference characters designate like parts throughout the several views.

A common form of planter includes a U-shaped wheel frame having longitudinally disposed side frame members 1, to which are secured bearing boxes 2, in which is journaled a rotatable axle 3, having traction and covering wheels 4 mounted upon its opposite ends, and 5 represents a transversely disposed frame member having its opposite ends secured to the members 1, 6 a transversely disposed runner frame member, to which are secured draft brackets 7 that are pivotally connected with the front ends of the wheel frame members 1, 8 a draft tongue connected with the runner frame member 6, 9 furrow opening runners having their front upturned ends connected with the runner frame by means of rearwardly diverging bars 10 and their rear ends secured to the lower ends of seed conduits 11 that carry at their upper ends seed hoppers 12, 13 a hand lever pivotally mounted upon the frame member 5 and operative in a manner to adjust the runner frame relative to the wheel frame in a common way, 14 a seed shaft journaled in bearings carried by the runner frame and actuating the seed dropping mechanism at the bottom of the seed hoppers and communicating with the seed conduits 11, and 15 a valve operating clutch tripping shaft journaled upon the runner frame. 16 represents a constantly rotatable sprocket wheel journaled upon the seed shaft 14 and connected by means of a sprocket chain 17 with a sprocket wheel 18 mounted upon the driving axle 3 and rotatable therewith. Integral with the sprocket wheel 16 is a sleeve member 19 that carries a clutch member 20 that is adapted to engage with a pivoted spring-pressed pawl 21 carried by an arm 22 mounted upon the seed shaft and operatively connected with a common form of variable drop clutch mechanism 23. The pawl 21 is normally held disengaged from the clutch member 20 by means of a roller 24 journaled upon a clutch tripping arm 25 formed integral with a sleeve 25' mounted upon the shaft 15. Sleeve 25' has also formed integral therewith an arm 25" which is connected, by means of an equalizing bar 26, with a second arm 27 secured to the shaft, the equalizing bar being connected, by means of a tension spring 28, with a fixed part of the runner frame in a manner whereby the force of the spring will yieldingly hold the roller 24 in engagement with the pawl 21. Heretofore the shaft 15 has been rocked to disengage the roller from the pawl at predetermined intervals by means of a check wire stretched across the field. With the mechanism here described the check wire is eliminated. Mounted upon the seed shaft 14, adjacent the sprocket wheel 16 and rotatable therewith, is a spur pinion 29 that meshes with a spur gear wheel 30 journaled upon a stud 31 carried by a bracket member 32 secured to the runner frame member 6 and having a bar 33 integral therewith that receives the shaft 14.

34 represents a disk clutch member journaled upon the stud 31 adjacent the hub of the gear wheel 30 and provided with a friction rim 35 that is disposed within the rim 36 of the gear wheel 30. 37 represents a split ring clutch member journaled upon the hub 38 of the gear wheel 30 and adapted to engage with the friction rim 35, the engagement thereof being controlled by a slidable wedge 39 having one end thereof seated in a groove 40 on the hub 38 and its opposite inclined end 41 engaging with an adjacent separate inclined end of the split ring 37 in a manner to expand it within the friction rim 35.

Secured to the disk 34 is a laterally extending stud 42, upon which is journaled a roller 43. 44 represents a depending arm adapted to turn about the axis of the seed shaft 14, having its lower end flexibly connected, by means of a link 45, with the arm 27 secured to the shaft 15, and provided with a shoulder portion 46 near its pivotal axis and adapted to be engaged by the roller 43 moving with the disk clutch member 34.

The ratio of the gear wheel 30 to the pinion 29, and of the sprocket wheel 16 to the sprocket wheel 18 is such as to cause one revolution of the gear wheel 30 and its associated clutch disk 34 during a predetermined advance of the traction wheels 4, which is usually 42 inches. At each forward advance of the traction wheels a distance of 42 inches, the roller 43 will engage the shoulder 46 on the arm 44 and trip the planter clutch and seed dropping mechanism into action. In the operation of this type of planter such uniform results have not been obtained, the principal disturbing feature being a creeping or skidding movement of the traction wheels due to varying soil conditions whereby the operation of the clutch tripping mechanism is delayed in a manner to cause an inaccurate checking operation of the mechanism. Means for correcting an irregular operation of the clutch tripping mechanism are provided including a laterally extending lug 47 upon the clutch disk 34 and disposed in rear of the roller 43 and not in position to engage with the shoulder 46 as the disk is rotated. Pivotally mounted on the wheel frame member 5 is a foot treadle 48, and pivoted to one arm thereof is the rear end of a link 49 provided with a hook member 50 at its front end that is adapted to engage with the lug 47. Pivotally connected with the frame member 5 are the front ends of rearwardly and downwardly extending drag bars 51, having a small trailing gage wheel 52 journaled upon their rear ends. The bars are normally pressed downward by means of a pressure spring 53 encircling a link 54, having its lower end pivotally connected with a spacing member 55 connecting the two drag bars, and its upper end slidably received by an opening in a clip 56 secured to the adjacent side frame member 1, the spring reacting between the clip and spacing member.

Means for controlling the operation of the drag bars and trailing wheel include a longitudinally disposed link 57, having its rear end pivoted on the spacing member 55 and its front end pivotally connected with the rear end of a second link 58, having its front end pivotally connected at 59 with the side frame member 1 of the wheel frame intermediate the frame member 5 and the pivotal axis of the front of the wheel frame with the runner frame. 60 represents a link connecting the adjacent meeting ends of the links 57 and 58 with the remaining arm 61 of the foot treadle 48. 62 represents a sleeve journaled upon the frame member 5 and turnable thereon with the hand lever 13, 63 an upstanding arm integral with the sleeve and having the front end of a bar 64 pivotally connected therewith, the body of the bar being slidably received by an opening through one end of a bracket 65 secured to the frame member 1, and its rear end provided with a cam portion 66 that is received by a groove 67 in the periphery of a sleeve 68 that is splined upon the axle 3 and provided with clutch teeth 69 that are adapted to engage with corresponding clutch teeth upon the hub of the adjacent sprocket wheel 18. If the runner frame is raised from the ground, as in turning at the end of the field, by means of the hand lever 13, the cam on the bar 64 disengages the sleeve 68 from the sprocket wheel 18 and the operation of the seed dropping mechanism is thereby suspended. After the ground has been prepared for planting or for the final harrowing or rolling operation, a series of relatively shallow furrows 70 are made in the soil and spaced apart regularly a distance from each other equal to the distance apart of the runners of the planter, or any multiple thereof. There may be a furrow for each row to be planted, or one for each five or ten rows, the furrows being made equidistant apart and parallel with each other. If the planter be arranged to check each 42 inches in the advance of the traction wheels, the axis of the gage wheel 52 will be 21 inches in rear of the discharge opening for the seed from the seed conduits 11. In operation, when the gage wheel drops into a furrow the link 49 is drawn rearward by the treadle 48 until the hook at its forward end engages a stop lug 71 extending laterally from the bracket member 32, thereby limiting the extent of drop of the gage wheel. After the gage wheel has moved out of the furrow the operator may press forward upon the foot treadle 48, thereby flexing the links 57 and 58 and lifting the drag bar 51 and raising the gage wheel from the ground and moving the links into a locking position. When the wheel approaches another furrow the operator presses downward upon the treadle, thereby breaking the locking position of the links, and the pressure spring 53, assisted by gravity, causes the gage wheel to drop into the furrow. If the planter wheel should skid or creep forward, causing a delay in or an irregular movement of the gear wheel 30 and the disk clutch member 34, the roller 43 will not be in a correct position to engage with the shoulder 46 to trip the clutch mechanism into action for an accurate checking of the row. The lug 47 varies the knockout roller 43 in the revolution of the clutch disk 34 and may be spaced therefrom any desired distance circumferentially within the range of movement of the link 49. If it be placed behind the roller a distance of one-seventh the circle passing through the axis of the roller, it will represent one-third the required distance through which the planter wheels must advance, or six inches. The roller 43 and the lug 47, as they are carried around by the clutch disk 34, will engage the hooked end of the link 49 and lift it, and it will fall into position, supported by the lug 71, to engage the lug 47 when the gage wheel drops into one of the furrows. When the knockout roller 43 is in a correct position to engage the shoulder 46 as the gage wheel drops into a furrow, the lug 47 is in axial alinement with the lug 71 and is not engaged by the hook 50 of the link 49. If the roller 43 is not in a correct position to engage the shoulder, its movement having been delayed by a skidding movement of the planter wheels, the lug 47 will be in the same position relative to the lug 71 and the hook 50 will engage therewith and turn the clutch disk 34 ahead of the rotation of the gear wheel 30 of the shoulder and move the lug 47 in alinement with the lug 71 and the roller 43 in engagement with the shoulder 46, and the rotation of the gear wheel is incidentally imparted to the clutch disk 34 and the planter clutch mechanism tripped into action by power derived from the planter wheels. If, therefore, the checking is inaccurate to the extent of 6 inches or any fraction thereof when the gage wheel drops into a furrow, it will automatically be corrected; and if the checking be accurate, the gage wheel, if dropped, will not affect the operation of the mechanism, as the link 49 rides freely upon the lug 71. In order to engage the lug 47 there will be what may be called a correction furrow at each end of the field to be planted, and as many more between them as may be necessary for sufficient accuracy of checking. When the runner frame is raised from the ground in turning, the sprocket wheel 18 is disconnected from the axle and may be rotated in unison with the clutch to place the checking mechanism in proper position with the correction furrow when starting at the end of the field.

Having shown and described one form of my invention, I do not wish that it be confined to the specific details of the structure as illustrated, it being understood that changes may be made in the form, proportion and organization of its several parts without departing from the spirit of my invention as defined by the scope of the appended claims.

What I claim as my invention, and desire to secure by Letters Patent, is:

1. In a planter, seed dropping mechanism, actuating means therefor including an intermittent clutch, timed tripping mechanism for the clutch, a common driving element for the clutch and the tripping mechanism, and regulating means connected to the tripping device including a projecting member positioned to engage a prepared obstacle on the field.

2. In a corn planter, seed dropping mechanism including an intermittently operating clutch mechanism, said clutch mechanism including a clutch tripping element, a second clutch mechanism for actuating said clutch tripping element, and means adapted to engage with a prepared obstacle on the field for controlling the operation of said second clutch mechanism.

3. In a corn planter, seed dropping mechanism including an intermittently operating clutch, a trip arm controlling said clutch, a second clutch mechanism having means for actuating said trip arm and including a driving and a driven rotatable element, said driven element being normally rotated in unison with said driving element, and means including a projecting element adapted to engage a prepared obstacle on the field for temporarily rotating the driven element at a greater speed than that of the driving element.

4. In a corn planter, seed dropping mechanism including an intermittently operating clutch, clutch tripping mechanism including a rotatable member, a common driving means for rotating said member continuously during the operation of the planter, and for operating the clutch and means for rotatably adjusting said member on its axis during the operation thereof.

5. In a corn planter, traction wheels, seed dropping mechanism, operating mechanism therefor including a clutch, means including a rotatable member for tripping said clutch, a common driving element for the clutch and rotatable member geared to the traction wheels and means for rotatably adjusting said member on its axis during the rotative movement thereof.

6. In a corn planter, traction wheels, seed dropping mechanism, operating mechanism therefor including a clutch, means including a revoluble member for tripping said clutch, operative connections between said member and said traction wheels for rotating said member, and supplemental means for rotating said revoluble member to correct said tripping means during the operation thereof by said traction wheels.

7. In a corn planter, traction wheels, seed dropping mechanism, operating mechanism therefor connected to said traction wheels and intermittently actuated by said wheels after the rotation thereof through a predetermined angle, and means actuated by a prepared obstacle on the field for automatically correcting said operating mechanism when the peripheral travel of said traction wheels does not equal the distance of advance of said planter.

8. In a corn planter, traction wheels, seed dropping mechanism including a clutch, means for tripping said clutch operable by said traction wheels after they have rotated through a predetermined angle, and means for automatically correcting said tripping means when the peripheral travel of the wheels does not equal the distance of advance of said planter.

9. In a corn planter, traction wheels, seed dropping mechanism including an intermittent clutch, clutch tripping mechanism timed with the angular movement of the wheels, and means adapted to engage a prepared obstacle on the field and operable when the planter has traveled a predetermined distance for restoring adjustment of said tripping mechanism.

10. In a corn planter, a wheel frame, traction wheels having said frame mounted thereon, a runner frame pivotally connected with said wheel frame, seed dropping elements carried by said runner frame and including rotatable clutch elements operatively connected with said traction wheels, clutch tripping mechanism coöperating with said clutch elements, and operatively connected to the traction wheels, a rising and falling element carried by said wheel frame and operatively connected with said tripping mechanism and adapted to engage with a prepared obstacle on the field to regulate the operation of said tripping mechanism.

11. In a corn planter, a wheel frame, a rotatable axle journaled upon said frame, traction wheels mounted upon opposite ends of said axle, a runner frame pivotally connected with said wheel frame, seed dropping mechanism carried by said runner frame and including an intermittently operating clutch mechanism operatively connected with said rotatable axle, a clutch tripping arm associated with said clutch mechanism, a second clutch mechanism operatively connected with said axle and including a driving and a driven member, said driven member being adapted to actuate said clutch tripping arm at predetermined intervals, a rising and falling trailing frame pivotally connected with said wheel frame, and operative connections between said trailing frame and the driven member of said second clutch mechanism whereby when said trailing frame falls into a prepared furrow it corrects an inaccurate movement of said driven member.

12. In a corn planter, a wheel frame, a rotatable axle journaled upon said frame, traction wheels mounted upon opposite ends of said axle, a runner frame pivotally connected with said wheel frame, seed dropping mechanism carried by said runner frame and including an intermittently operating clutch mechanism operatively connected with said rotatable axle, a clutch tripping arm associated with said clutch mechanism, a second clutch mechanism operatively connected with said axle and including a driving and a driven member, said driven member being adapted to actuate said clutch tripping arm at predetermined intervals, a longitudinally disposed drag bar having its front end pivotally connected with said wheel frame, a gage wheel journaled upon the rear end of said bar and adapted to drop into a prepared furrow, a foot treadle controlling a rising and falling movement of said gage wheel, and operative connections between said foot treadle and the driven member of said second clutch mechanism whereby an inaccurate movement of said driven member is corrected when said gage wheel falls into a prepared furrow.

13. In a corn planter, a wheel frame, a rotatable axle journaled upon said frame, traction wheels mounted upon opposite ends of said axle, a runner frame pivotally connected with said wheel frame, seed dropping mechanism carried by said runner frame and including an intermittently operating clutch mechanism operatively connected with said rotatable axle, a clutch tripping arm associated with said clutch mechanism, a second clutch mechanism operatively connected with said axle and including a driving and a driven member, said driven member being adapted to actuate said clutch tripping arm at predetermined intervals, a longitudinally disposed drag bar having its front end pivotally connected with said wheel frame, a gage wheel journaled upon the rear end of said bar and adapted to drop into a prepared furrow, a foot treadle pivoted upon said wheel frame, a toggle link connection between said foot treadle and said drag bar, a link having one end connected with said foot treadle and its opposite end adapted to engage with the driven member of said second clutch mechanism whereby an inaccurate movement of said driven member is automatically corrected when said gage wheel falls into a prepared furrow.

14. In a corn planter, a wheel frame, a rotatable axle journaled upon said frame, traction wheels mounted upon opposite ends of said axle, a runner frame pivotally connected with said wheel frame, seed dropping mechanism carried by said runner frame and including an intermittently operating clutch mechanism operatively connected with said rotatable axle, a clutch tripping arm associated with said clutch mechanism, a second clutch mechanism operatively connected with said axle and including a driven and a driving member, projections on said driven member adapted to actuate said clutch tripping arm at predetermined intervals in the advance of said traction member, a rising and falling gage wheel carried by said wheel frame, and operative connections between said gage member and the driven member of said second clutch mechanism whereby when said gage member falls into a prepared furrow a delay in the advance of said projection is corrected.

15. In a corn planter, a wheel frame, a rotatable axle journaled upon said frame, traction wheels mounted upon opposite ends of said axle, a runner frame pivotally connected with said wheel frame, seed dropping mechanism carried by said runner frame and including an intermittently operating clutch mechanism operatively connected with said rotatable axle, a clutch tripping arm associated with said clutch mechanism, a second clutch mechanism operatively connected with said axle and including a driving and a driven member, a roller carried by said driven member and adapted to actuate said clutch tripping arm at predetermined intervals in the advance of said traction wheels, a laterally projecting lug on said driven member spaced apart circumferentially from the axis of said roller, a rising and falling gage member carried by said wheel frame, a hook member actuated by a rising and falling movement of said gage member and adapted to engage with said lug, and a stop member carried by said runner frame and adapted to limit a movement of said hook member in one direction.

In testimony whereof I affix my signature.

EDWARD W. BURGESS.